United States Patent
Toews et al.

(10) Patent No.: US 8,033,376 B2
(45) Date of Patent: Oct. 11, 2011

(54) STEERABLE CONVEYOR

(76) Inventors: Bernie John Toews, MacGregor (CA);
Dean Bernie Toews, MacGregor (CA);
Devin John Toews, MacGregor (CA);
Darren Bryce Toews, MacGregor (CA)

( * ) Notice: Subject to any disclaimer, the term of this patent is extended or adjusted under 35 U.S.C. 154(b) by 0 days.

(21) Appl. No.: 12/967,939

(22) Filed: Dec. 14, 2010

(65) Prior Publication Data
US 2011/0079487 A1    Apr. 7, 2011

Related U.S. Application Data

(63) Continuation-in-part of application No. 12/327,032, filed on Dec. 3, 2008.

(30) Foreign Application Priority Data

Dec. 10, 2007  (CA) ..................................... 2614538

(51) Int. Cl.
*B65G 41/00*    (2006.01)
(52) U.S. Cl. ........ 198/300; 280/419; 180/253; 414/503; 414/526
(58) Field of Classification Search .................. 198/300, 198/311, 317; 280/419, 426, 442, 443, 492; 180/253, 264, 308, 411; 414/503, 526
See application file for complete search history.

(56) References Cited

U.S. PATENT DOCUMENTS

| | | | | |
|---|---|---|---|---|
| 3,880,303 A * | 4/1975 | Coval | ............................ | 414/528 |
| 3,930,669 A * | 1/1976 | Kollander et al. | ............ | 280/426 |
| 4,219,208 A * | 8/1980 | Fuller et al. | ................ | 280/89.12 |
| 4,286,798 A * | 9/1981 | Butler et al. | .................. | 280/81.5 |
| 4,382,607 A * | 5/1983 | Voight | .......................... | 280/408 |
| 4,460,194 A * | 7/1984 | McGhie et al. | ............... | 280/443 |
| 4,468,047 A * | 8/1984 | McGhie et al. | ............... | 280/419 |
| 5,048,852 A * | 9/1991 | Chikuma et al. | ............. | 180/414 |
| 5,067,741 A * | 11/1991 | Ayme | ............................ | 280/419 |
| 5,207,443 A * | 5/1993 | Mitchell | ....................... | 280/426 |
| 5,908,081 A * | 6/1999 | Olson | ............................ | 180/419 |
| 6,125,618 A * | 10/2000 | Dillon | ........................... | 56/14.6 |
| 6,308,976 B1 * | 10/2001 | Mitchell | ....................... | 280/419 |
| 6,386,352 B1 * | 5/2002 | Baker et al. | .................. | 198/303 |
| 6,688,450 B2 * | 2/2004 | Speers et al. | .................. | 198/312 |
| 6,776,569 B1 * | 8/2004 | McMahon et al. | ............ | 414/505 |
| 6,932,173 B2 * | 8/2005 | Henderson | ................. | 180/24.01 |
| 7,267,519 B2 * | 9/2007 | Cresswell et al. | ............ | 414/526 |

FOREIGN PATENT DOCUMENTS

CA         2614538        12/2007

* cited by examiner

*Primary Examiner* — Douglas Hess
(74) *Attorney, Agent, or Firm* — Ryan W. Dupuis; Kyle R. Satterthwaite; Ade & Company Inc.

(57) ABSTRACT

The steerable conveyor includes a conveyor frame supported on a first pair of wheels and a second pair of wheels at laterally opposed first and second sides of the conveyor. The conveyor includes a hitch for connection to a towing vehicle such that the conveyor is pivotal relative to the towing vehicle about a vertical steering axis. A steering mechanism is arranged to pivot all of the steerable wheels relative to the conveyor frame about respective upright steering axes in a common direction of rotation such that the conveyor is arranged to be steered relative to the towing vehicle about the vertical steering axis by steering the conveyor wheels relative to the conveyor frame when the conveyor is towed by the towing vehicle.

15 Claims, 3 Drawing Sheets

STEERABLE CONVEYOR

This application is a continuation-in-part of U.S. patent application Ser. No. 12/327,032, filed Dec. 3, 2008, and claims foreign priority benefits from Canadian Patent Application 2,614,538, filed Dec. 10, 2007.

FIELD OF THE INVENTION

The present invention relates to an agricultural conveyor having wheels which are steerable relative to a frame of the conveyor such that the conveyor can be steered relative to a towing vehicle when towing the conveyor, and more particularly the present invention relates to a steering mechanism for commonly steering the wheels of the conveyor when the conveyor is supported on two laterally opposed pairs of wheels.

BACKGROUND

Conveyors, and more particularly auger type screw conveyors, are available in relatively large sizes for agricultural applications. Conveyors of this type typically include a tubular housing supported on wheels which are parallel and spaced apart from one another on opposing sides of the housing and fixed in orientation for rolling movement in the longitudinal direction of the housing so as to be suitable for towing by a tractor and the like. Because of the large sizes of some conveyors, these conveyors can be very difficult and awkward to navigate during transport.

Some larger agricultural conveyors are supported on first and second pairs of wheels at respective first and second laterally opposed sides of the conveyor frame. In this instance, the wheels of each pair of wheels are longitudinally spaced at opposing ends of a walking beam providing some relative suspension between the wheels. The longitudinally spaced wheels can be even more difficult to navigate during transport due to the wheels being restricted from pivoting in orientation relative to one another.

Auger moving kits are known, for example a self propelled auger transport kit available by Wheatheart, but such known systems are typically very limited in size and involve the costly addition of an auxiliary set of wheels supported on an auxiliary frame along with an additional motor suitable only for transport of smaller agricultural augers. Steering is typically accomplished in a skid steer configuration. No means are provided for steering the conveyor relative to a vehicle during transport.

Canadian Patent 2,614,538, filed Dec. 10, 2007, by Toews, discloses a steering mechanism for a conveyor when the conveyor is only supported on two wheels which are laterally spaced along a common rolling axis. The steering mechanism in the form described is not readily adaptable to two pairs of wheels supported on a walking beam suspension as found on some larger agricultural conveyors.

Various examples are known for steering the trailing wheels of a vehicle or a trailer, particularly those with longitudinally spaced pairs of wheels. Some examples are disclosed in U.S. Pat. No. 4,286,798 by Butler et al, U.S. Pat. No. 5,207,443 by Mitchell and U.S. Pat. No. 3,930,669 by Kollander et al. None of the examples in the prior art are suitable for use on an agricultural conveyor for effectively steering the trailing movement of the conveyor relative to the towing vehicle.

SUMMARY OF THE INVENTION

According to one aspect of the invention there is provided a steerable conveyor for use with a towing vehicle in which the towing vehicle comprises a vehicle frame supported for rolling movement in a forward direction on vehicle wheels which are steerable relative to the vehicle frame, the conveyor comprising:

a conveyor housing for conveying material therein in a longitudinal direction from an inlet end to an outlet end;

a conveyor frame supporting the conveyor housing thereon;

a first pair of wheels and a second pair of wheels supporting laterally opposed first and second sides of the conveyor frame respectively thereon for rolling movement along the ground;

each wheel of each pair of wheels comprising a steerable wheel which is pivotal about a respective upright axis relative to the conveyor frame;

a hitch connector arranged for connection to the towing vehicle such that the conveyor frame is arranged to be pivotal relative to the towing vehicle about a vertical steering axis of the hitch connector and such that the conveyor frame is arranged to be movable together with the towing vehicle for rolling movement in the forward direction;

a steering mechanism arranged to pivot each of the steerable wheels of both pairs of wheels together relative to the conveyor frame in a common direction of rotation such that the conveyor housing is arranged to be steerable relative to the towing vehicle about the vertical steering axis when the conveyor housing is towed for rolling movement in the forward direction with the towing vehicle; and a controller arranged to control the steering mechanism of the steerable wheels.

By providing a steering mechanism which commonly steers all of the wheels, each about their own axis, effective steering of an agricultural conveyor relative to a towing vehicle can be accomplished even when the conveyor is supported on two pairs of wheels such as a walking beam suspension for example. The controller allows the steering mechanism to control the path that the conveyor follows relative to the towing vehicle even when the conveyor wheels trails behind the towing vehicle by a considerable distance as in a larger screw auger or belt conveyors. The independent controller of the steering mechanism allows the conveyor to be readily navigated around various obstacles by also following a narrower or wider path than the towing vehicle if desired.

Preferably the two wheels of the first pair of wheels are spaced apart in the longitudinal direction at the first side of the conveyor frame and the two wheels of the second pair of wheels are spaced apart in the longitudinal direction at the second side of the conveyor frame.

The steering mechanism preferably comprises an actuator associated with each steerable wheel in which the actuators are arranged to be commonly controlled by the controller.

In some embodiments, the actuator associated with each steerable wheel may comprise an electrically driven actuator.

More preferably, the actuator associated with each steerable wheel comprises a linear hydraulic actuator.

When provided in combination with the towing vehicle in which the towing vehicle comprises a controllable hydraulic output, the hydraulic actuators are preferably commonly connected to the controllable hydraulic output.

All of the hydraulic actuators of the steerable wheels may be connected in series with one another such that each actuator comprises a rephasing port in connection with another one of the other actuators.

Typically each actuator comprises a retraction port arranged to retract the actuator when receiving hydraulic fluid therein and an extension portion arranged to extend the actuator when receiving hydraulic fluid therein. In a re-phasing configuration, preferably two of the actuators comprise first actuators which are arranged to rotate the associated steerable wheels in a first direction about their respective upright axes when the first actuators are extended and two of the actuators comprise second actuators which are arranged to rotate the associated steerable wheels in a second direction about their respective upright axes opposite to the first direction when the second actuators are extended. In this instance, the extension port of each first actuator is preferably hydraulically connected to the extension port of a respective one of the second actuators and the retraction port of one of the second actuators is preferably hydraulically connected to the retraction port of one of the first actuators such that all of the actuators are hydraulically connected in series with one another in the re-phasing configuration. In this instance, the actuators associated with all of the steerable wheels may be identical in size and configuration relative to one another.

When the actuator associated with each steerable wheel comprises a cylinder end and a piston end, each actuator is preferably coupled to the conveyor frame at the cylinder end and is preferably coupled to the respective steerable wheel at the piston end.

When the upright axes of the two steerable wheels of the first pair of wheels are longitudinally spaced apart in a first common plane and the upright axes of the two steerable wheels of the second pair of wheels are longitudinally spaced apart in a second common plane, preferably the first and second common planes are oriented parallel to the longitudinal direction.

The two wheels of the first pair of wheels may be supported at longitudinally opposed ends of a respective beam extending in the longitudinal direction at the first side of the conveyor frame and the two wheels of the second pair of wheels may be supported at longitudinally opposed ends of a respective beam extending in the longitudinal direction at the second side of the conveyor frame. In this instance, the two wheels of the first pair of wheels may be offset in laterally opposed directions from the respective beam and the two wheels of the second pair of wheels may be offset in laterally opposed directions from the respective beam.

When the steering mechanism comprises an actuator associated with each steerable wheel, each actuator is preferably supported on the respective beam laterally opposite to the associated steerable wheel.

The frame may further comprise a pair of walking beams supporting the conveyor frame on the two pairs of wheels respectively in which the walking beams extending generally in the longitudinal direction and are spaced apart from one another in a lateral direction oriented transversely to the longitudinal direction at opposing sides of the conveyor frame. In this instance, each walking beam may be supported on a respective one of the pairs of wheels such that the wheels are supported at longitudinally opposing ends of the walking beam, and each walking beam may be pivotally coupled to the conveyor frame for relative pivotal movement about a walking beam axis oriented generally in the lateral direction.

When provided in combination with the vehicle frame, preferably the controller is arranged to control the steering mechanism of the steerable wheels of the conveyor independently of the steering of the vehicle wheels relative to the vehicle frame.

According to a second aspect of the present invention there is provided a steerable conveyor in combination with a towing vehicle in which the towing vehicle comprises a vehicle frame supported for rolling movement in a forward direction on vehicle wheels which are steerable relative to the vehicle frame, the conveyor comprising:

a conveyor housing for conveying material therein in a longitudinal direction from an inlet end to an outlet end;

a conveyor frame supporting the conveyor housing for rolling movement on respective steerable wheels which are pivotal about respective upright axis relative to the conveyor frame;

a hitch connector for connecting the conveyor housing to the towing vehicle such that the conveyor housing is pivotal relative to the towing vehicle about a vertical steering axis of the hitch connector and such that the conveyor frame is movable together with the towing vehicle for rolling movement in the forward direction;

a steering mechanism arranged to commonly pivot the steerable wheels together relative to the conveyor frame such that the conveyor housing is steerable relative to the towing vehicle about the vertical steering axis when the conveyor housing is towed for rolling movement in the forward direction with the towing vehicle;

a controller in the towing vehicle arranged to control the steering mechanism of the steerable wheels of the conveyor independently of the steering of the vehicle wheels relative to the vehicle frame.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
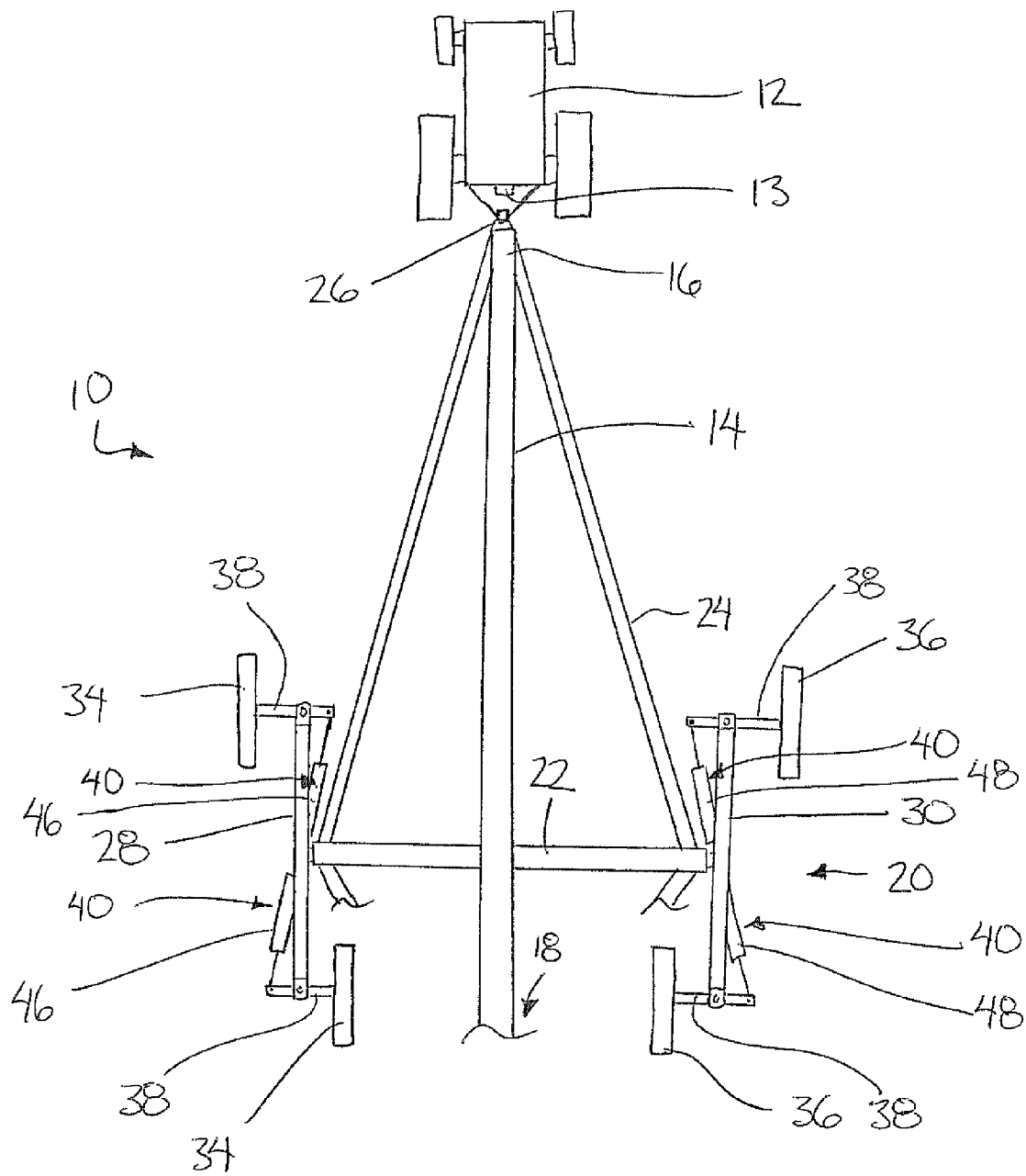
FIG. 1 is a schematic top plan view of the wheels of the steerable conveyor oriented in the forward direction of the towing vehicle.
Figure 2:
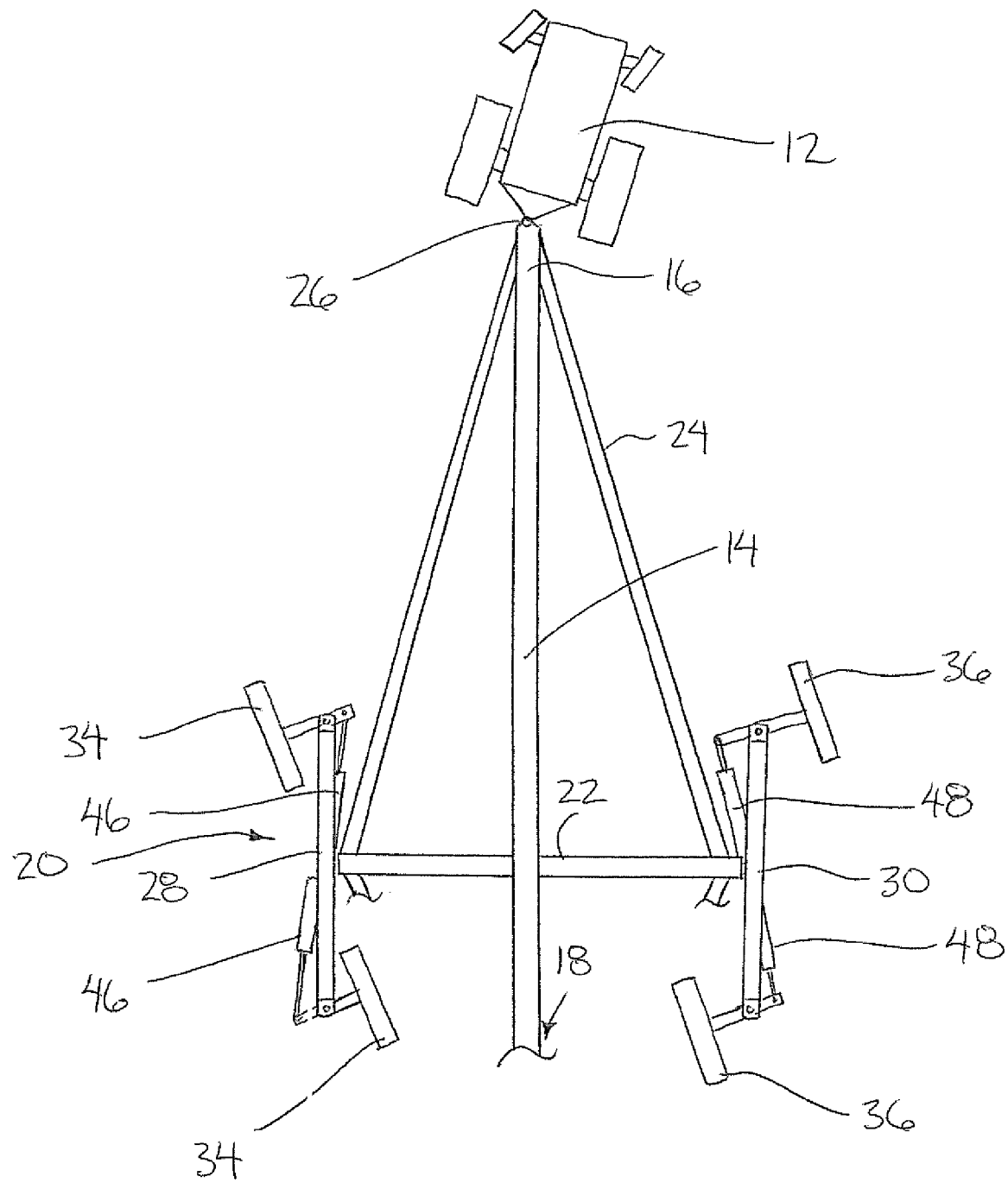
FIG. 2 is a schematic top plan view of the steerable wheels of the conveyor shown commonly pivoted in a first lateral direction relative to the forward direction of the towing vehicle which is opposite to the direction of the steerable wheels of the vehicle which are steered towards a second lateral direction in relation to the forward direction of the vehicle.
Figure 3:
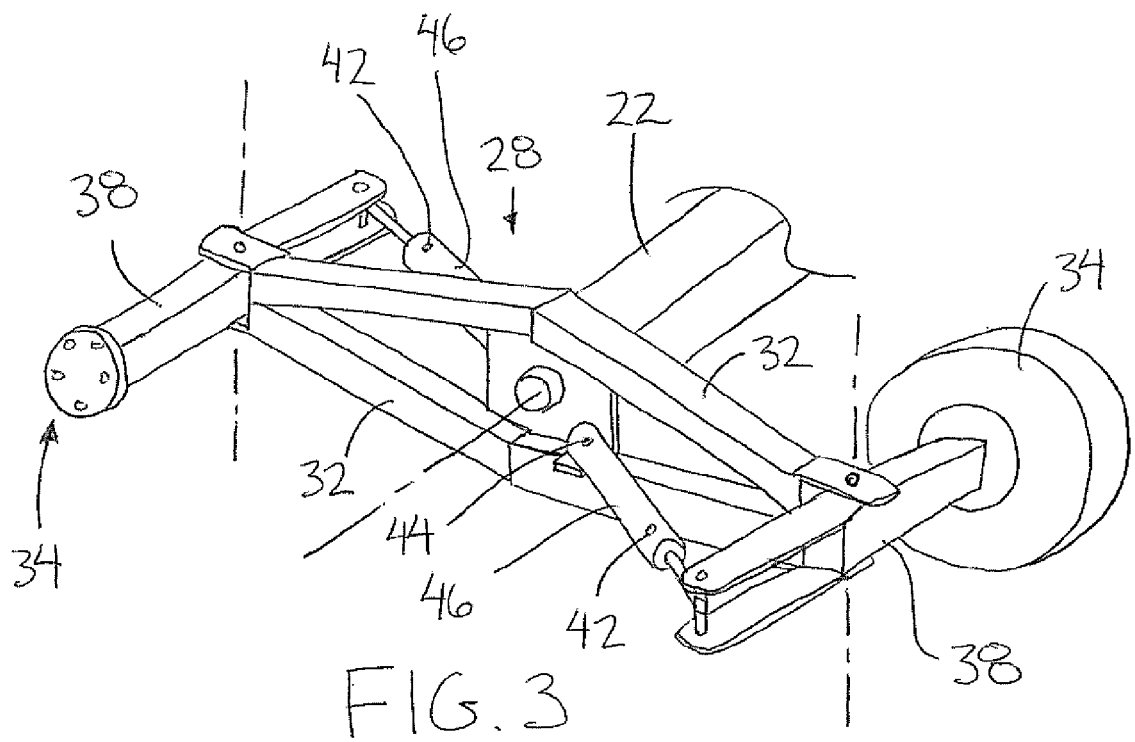
FIG. 3 is a perspective view of one of the walking beams at one side of the conveyor frame with one of the steerable wheels shown removed from its hub.

Referring to the accompanying figures there is illustrated a steerable conveyor generally indicated by reference numeral 10. The conveyor 10 typically comprises an agricultural conveyor, for example a large screw type auger conveyor or a belt conveyor.

The conveyor is typically transported by connection to a towing vehicle 12, for example an agricultural tractor, a highway truck, or other implement handling equipment supported on its own vehicle wheels for rolling movement along the ground in a forward working direction in normal use. The vehicle 12 is also steerable and movable in an opposing rearward direction as in most convention wheeled vehicles. In a preferred embodiment, the towing vehicle comprises a hydraulic output 13 which is controllable by an operator of the vehicle to control steering of the conveyor relative to the towing vehicle. The hydraulic output 13 is controllable independently of the vehicle steering control which controls steering of the vehicle wheels relative to a frame of the vehicle so that steering of the conveyor relative to the towing vehicle is independent of the steering of the vehicle wheels relative to the vehicle frame. In the instance of a highway truck or other implement handling equipment, the hydraulic output 13 may be provided by an auxiliary hydraulic power unit which is powered by the vehicle electrically so that the output 13 can be similarly controlled independently by the operator of the vehicle.

The conveyor 10 of the illustrated embodiment comprises an elongate tubular housing 14 supporting a screw auger or belt therein which is arranged to convey material in a longitudinal direction of the housing from an inlet end 16 to an outlet end 18 of the housing when the screw auger is rotated about a longitudinal axis thereof or the belt is rotated in the usual manner. A conveyor frame 20 supports the housing 14 at an upward angle or inclination from the inlet end 16 to the outlet end 18 thereof.

The conveyor frame 20 includes a cross bar 22 which spans in a lateral direction between opposing first and second sides of the conveyor frame so as to be oriented generally perpendicularly to the longitudinal direction. A plurality of support arms 24 extend upwardly from the cross bar in the form of an adjustable linkage which supports the housing at various inclinations about the frame. In particular, the linkage formed by the support arms is arranged for movement relative to the housing between a working position extending at an upward inclination from the inlet end to the outlet end and a transport position in which the housing is nearer to horizontal than the working position. A hitch connector 26 is located at the inlet end of the housing and is connected to the conveyor frame either directly by hitching arms or through connection to the housing. The hitch connecter 26 is arranged for connection to the hitch of a towing vehicle such that the conveyor frame is arranged to be pivotal relative to the towing vehicle about a vertical steering axis of the hitch connector and such that the conveyor frame is arranged to be moveable together with the towing vehicle for rolling movement in the forward direction.

The cross bar 22 of the conveyor frame is carried on a first walking beam 28 and a second walking beam 30 which are oriented generally in the longitudinal direction so as to be parallel and laterally spaced apart from one another at opposing first and second sides of the conveyor frame respectively. Each walking beam is pivoted at a central location in the longitudinal direction on a respective one of the two opposing ends of the cross bar 22 such that the two walking beam are pivotal relative to the frame about a common horizontal walking beam axis extending in the lateral direction.

Each walking beam comprises upper and lower frame members 32 extending in the longitudinal direction above and below the walking beam axis respectively so as to be joined with one another at the longitudinally opposed ends of the beams.

The first walking beam is supported for rolling movement on the ground on a first pair of steerable wheels 34 coupled to the opposing ends of the beam respectively. Similarly the second walking beam 30 is supported for rolling movement on the ground on a second pair of steerable wheels 36 supported on the longitudinally opposed ends thereof.

On both walking beams, the steerable wheel nearest to the inlet end of the conveyor housing is off-set laterally outward to an outer side of the respective beam. Alternatively the steerable wheel nearest to the outlet end of the conveyor housing is off-set laterally inwardly towards an inner side of the beam such that the two steerable wheels nearest to the outlet end are closer together than the two steerable wheels at the inlet end. This arrangement accommodates for support arms extending towards the hitch connector at the inlet end of the housing. The two steerable wheels for each beam are thus laterally off-set in opposing directions from the beam.

Each steerable wheel is supported on the beam by a respective steer arm 38 which is oriented in the lateral direction so as to be perpendicular to the longitudinal direction when the respective wheel is oriented for rolling movement in the longitudinal direction. The steering arm is pivotally coupled to the end of the respective walking beam about an upright axis which defines a steering axis of the steering arm and respective steerable wheel pivotal therewith relative to the walking beam of the conveyor frame. Each pair of wheels of each walking beam are thus pivoted about respective axis located at the ends of the beam in a generally common vertical plane such that the first and second common vertical planes are parallel and laterally spaced apart at opposing sides of the conveyor frame.

A first portion of each steering arm extends in the lateral direction from the beam in the direction of off-set of the respective wheel supported on the end thereof. In addition to the first portion spanning towards the respective wheel supported thereon, each steering arm also includes a second portion diametrically opposite the first portion supporting the wheel thereon such that the second portion projects generally laterally in the opposing direction from the respective beam for connection to a common steering mechanism arranged to pivot each of the steerable wheels of both pairs of wheels together relative to the conveyor frame in a common direction of rotation. The conveyor frame and housing supported thereon are thus arranged to be steerable relative to the towing vehicle about the vertical axis of the hitch connector when the conveyor housing is towed for rolling movement in the forward direction with the towing vehicle.

The steering mechanism comprises an actuator 40 associated with each of the four steerable wheels. Each actuator 40 comprises a linear hydraulic actuator having a cylinder end and an opposing piston end which is arranged to be extended and retracted in relation to the cylinder end for varying the length of the actuator in a linear direction. A cylinder portion of each actuator includes a retraction port 42 and an extension port 44. The retraction port serves to retract the piston end into the cylinder end when receiving a flow of hydraulic fluid under pressure therein. Alternatively, the extension port is arranged to extend the piston end away from the cylinder end when receiving a flow of hydraulic fluid under pressure therein.

In the illustrated embodiment, all of the actuators 40 are connected in series with one another in a rephasing configuration such that all of the actuators are identical in size and configuration relative to one another. Among the actuators 40, two of the actuators comprise first actuators 46 at the first side of the frame which are oriented to rotate the steerable wheels associated therewith in first direction about their respective steering axis when the first actuators are extended. The first actuators also rotate the respective wheels in an opposing second direction when retracted.

The actuators 40 also include two second actuators 48 located on the second walking beam at the opposing second side of the frame which are instead mounted in an orientation to rotate the associated steerable wheels in the first direction about their respective axes when the actuators are retracted. The second actuators also rotate the respective wheels in the opposing second direction when extended.

The controllable hydraulic output of the vehicle includes a supply line 50 for supply hydraulic fluid under pressure therefrom, and a return line 52 for returning hydraulic fluid to the towing vehicle. A suitable switching block 54 including check valves serves to connect the supply line 50 to a first input 56 for operation in one direction in a first position of the switching block and to connect the supply line 50 to a second input 58 for steering the wheels in the opposing direction in a second position of the switching block. In each position, the other input 56 or 58 which is not connected to the supply line functions as a return connected to the return line 52.

Figure 4:
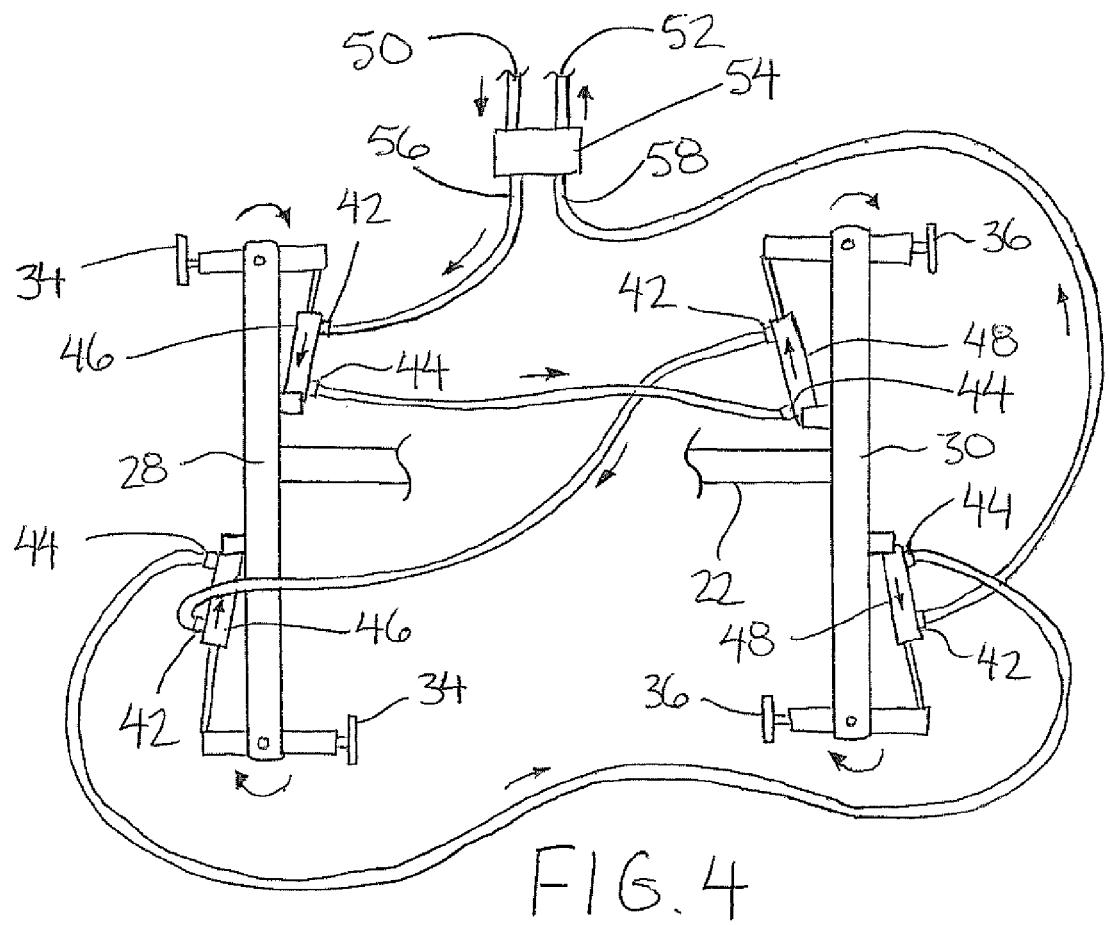
FIG. 4 is a schematic view of the hydraulic circuit connecting the actuators of the steering mechanism according to a preferred embodiment.

As shown in the illustrated embodiment of FIG. 4, the first input 56 is connected to the retraction port of one of the first actuators at the first side of the frame. The extension port of that first actuator is in turn connected to the corresponding extension port of a respective one of the second actuators at the second side of the frame. The retraction port of that second actuator is in turn coupled to the retraction port of the other first actuator while the extension port of said other first actuator is connected to the extension port of the other second actuator. By connecting the retraction port of said other second actuator back to the second input 58 all of the actuators are effectively hydraulically connected in series with one another in a rephasing configuration and at least one port of each actuator acts as a rephasing port in connection with another one of the actuators.

As shown in FIG. 4, actuation of the steering of the wheels in a first direction is shown by supplying hydraulic fluid to the first input 56 and connecting the second input 58 to the return. As shown by the arrows indicating the flow of hydraulic fluid, both of the first actuators are retracted while both of the second actuators are extended so that all of the steerable wheels are pivoted in a common direction of rotation. Alternatively, connecting the hydraulic supply to the second input 58 would cause retraction of both of the second actuators which would in turn extend both of the first actuators to again rotate all of the steerable wheels together, but in the opposing direction.

The re-phasing configuration is accomplished by mounting the first and second actuators in alternating configuration relative to one another and by supporting each actuator on a laterally opposed side of the beam from the associated steerable wheel. More particularly each actuator is mounted at a cylinder and to be fixed in position relative to the frame while being mounted at the piston end to the second portion of the steering arm of the respective wheel at a location diametrically opposite from the wheel such that the wheel is steered together with movement of the piston end relative to the cylinder end of the actuator.

In further arrangements, the actuators may comprise electrically driven actuators or other forms of hydraulic actuators such as rotary motors and the like. Also, the hydraulic cylinders may be connected in series such that the retraction port of each cylinder connects to the extension port of an adjacent cylinder by appropriately changing the size and configuration from one actuator to the next in the series to maintain an equal amount of linear displacement among the series of actuators. Furthermore, some of the wheels may be interconnected by mechanical linkages so that fewer individual actuators are required. Individual actuators associated with respective wheels are preferred however so as not to interfere with the walking beam suspension.

In some embodiments, the two wheels of each walking beam can be steered together using a single actuator by connecting the actuator to a control arm pivotally mounted on the beam such that separate link arms connect the control arm to the steering arms of the two wheels respectively. The use of a central control arm is suited for use with wheels on laterally opposed sides of the beam. Alternatively, by mounting the pair of wheels on the same side of the walking beam, a single link arm may be connected between the steering arms of the two wheels so that a single actuator controls movement of the single link arm to pivot the steering arms and wheels together.

In use, the conveyor is towed by the towing vehicle by connection of the hitch connector at the inlet end of the housing to the hitch of the towing vehicle. The path of the vehicle is steered in the usual manner by steering the vehicle wheels relative to the frame of the vehicle. The path of the conveyor relative to the towing vehicle can be selected to be the same, narrower or wider than the path of the towing vehicle using a controller on the towing vehicle which controls the actuators of the steering mechanism to commonly pivot all of the steerable wheels together in a common lateral direction offset from the longitudinal direction.

When rolling generally in the forward direction or an opposing rearward direction with the towing vehicle, steering the wheels of the conveyor relative to the frame of the conveyor effectively controls steering of the conveyor frame relative to the vehicle about the vertical steering axis of the hitch connection. Because all of the wheels are steered together in a common direction, the path of the conveyor can be accurately controlled by the towing vehicle independently of the steering of the towing vehicle.

Typically if the vehicle wheels are steered to be angularly offset from the forward or rearward direction in a first lateral direction, all of the wheels of the conveyor are steered to be angularly offset from the longitudinal direction of the conveyor in an opposing second lateral direction opposite to the first lateral direction to enable the conveyor to substantially follow the path of the towing vehicle in the forward direction or to lead the path of the towing vehicle in the rearward direction.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A steerable conveyor for use with a towing vehicle in which the towing vehicle comprises a vehicle frame supported for rolling movement in a forward direction on vehicle wheels which are steerable relative to the vehicle frame, the conveyor comprising:

a conveyor housing for conveying material therein in a longitudinal direction from an inlet end to an outlet end;

a conveyor frame supporting the conveyor housing thereon;

a first pair of wheels and a second pair of wheels supporting laterally opposed first and second sides of the conveyor frame respectively thereon for rolling movement along the ground;

a pair of walking beams supporting the conveyor frame on the two pairs of wheels respectively, the walking beams extending generally in the longitudinal direction and being spaced apart from one another in a lateral direction oriented transversely to the longitudinal direction at opposing sides of the conveyor frame, each walking beam being supported on a respective one of the pairs of wheels such that the wheels are supported at longitudinally opposing ends of the walking beam, and each walking beam being pivotally coupled to the conveyor frame for relative pivotal movement about a walking beam axis oriented generally in the lateral direction;

each wheel of each pair of wheels comprising a steerable wheel which is pivotal about a respective upright axis relative to the conveyor frame;

a hitch connector arranged for connection to the towing vehicle such that the conveyor frame is arranged to be pivotal relative to the towing vehicle about a vertical steering axis of the hitch connector and such that the conveyor frame is arranged to be movable together with the towing vehicle for rolling movement in the forward direction;

a steering mechanism arranged to pivot each of the steerable wheels of both pairs of wheels together relative to the conveyor frame in a common direction of rotation such that the conveyor housing is arranged to be steerable relative to the towing vehicle about the vertical steering axis when the conveyor housing is towed for rolling movement in the forward direction with the towing vehicle; and a controller arranged to control the steering mechanism of the steerable wheels.

2. The steerable conveyor according to claim 1 wherein the two wheels of the first pair of wheels are spaced apart in the longitudinal direction at the first side of the conveyor frame and the two wheels of the second pair of wheels are spaced apart in the longitudinal direction at the second side of the conveyor frame.

3. The steerable conveyor according to claim 1 wherein the steering mechanism comprises an actuator associated with each steerable wheel in which the actuators are arranged to be commonly controlled by the controller.

4. The steerable conveyor according to claim 3 wherein the actuator associated with each steerable wheel comprises a linear actuator.

5. The steerable conveyor according to claim 4 wherein the actuator associated with each steerable wheel comprises a hydraulic actuator.

6. The steerable conveyor according to claim 5 in combination with the towing vehicle in which the towing vehicle comprises a controllable hydraulic output, the hydraulic actuators being commonly connected to the controllable hydraulic output.

7. The steerable conveyor according to claim 5 wherein all of the hydraulic actuators of the steerable wheels are connected in series with one another such that each actuator comprises a rephasing port in connection with another one of the other actuators.

8. The steerable conveyor according to claim 7 wherein:

each actuator comprises a retraction port arranged to retract the actuator when receiving hydraulic fluid therein and an extension portion arranged to extend the actuator when receiving hydraulic fluid therein;

two of the actuators comprise first actuators which are arranged to rotate the associated steerable wheels in a first direction about their respective upright axes when the first actuators are extended;

two of the actuators comprise second actuators which are arranged to rotate the associated steerable wheels in a second direction about their respective upright axes opposite to the first direction when the second actuators are extended;

the extension port of each first actuator being hydraulically connected to the extension port of a respective one of the second actuators and the retraction port of one of the second actuators being hydraulically connected to the retraction port of one of the first actuators such that all of the actuators are hydraulically connected in series with one another in a re-phasing configuration.

9. The steerable conveyor according to claim 8 wherein the actuators associated with all of the steerable wheels are identical in size and configuration relative to one another.

10. The steerable conveyor according to claim 5 wherein the actuator associated with each steerable wheel comprises a cylinder end and a piston end, each actuator being coupled to the conveyor frame at the cylinder end and being coupled to the respective steerable wheel at the piston end.

11. The steerable conveyor according to claim 3 wherein the actuator associated with each steerable wheel comprises an electrically driven actuator.

12. The steerable conveyor according to claim 1 wherein the upright axes of the two steerable wheels of the first pair of wheels are longitudinally spaced apart in a first common plane and the upright axes of the two steerable wheels of the second pair of wheels are longitudinally spaced apart in a second common plane, the first and second common planes being oriented parallel to the longitudinal direction.

13. The steerable conveyor according to claim 1 wherein the two wheels of the first pair of wheels are supported at longitudinally opposed ends of a respective beam extending in the longitudinal direction at the first side of the conveyor frame and the two wheels of the second pair of wheels are supported at longitudinally opposed ends of a respective beam extending in the longitudinal direction at the second side of the conveyor frame, wherein the two wheels of the first pair of wheels are offset in laterally opposed directions from the respective beam and the two wheels of the second pair of wheels are offset in laterally opposed directions from the respective beam.

14. The steerable conveyor according to claim 1 wherein the steering mechanism comprises an actuator associated with each steerable wheel, each actuator being supported on the respective beam laterally opposite to the associated steerable wheel.

15. The steerable conveyor according to claim 1 in combination with the vehicle frame wherein the controller is arranged to control the steering mechanism of the steerable wheels of the conveyor independently of the steering of the vehicle wheels relative to the vehicle frame.

* * * * *